US012771664B2

(12) United States Patent
Bhargava et al.

(10) Patent No.: US 12,771,664 B2
(45) Date of Patent: Oct. 20, 2026

(54) INTELLIGENT HISTORY MANAGEMENT IN CHATBOTS

(71) Applicant: Dell Products L.P., Round Rock, TX (US)

(72) Inventors: Vivek Bhargava, Bangalore (IN); Harshit Gupta, West Bengal (IN); Abhishek Mishra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 39 days.

(21) Appl. No.: 19/073,765

(22) Filed: Mar. 7, 2025

(65) Prior Publication Data

US 2026/0270228 A1 Sep. 10, 2026

(51) Int. Cl.
*G06F 15/16* (2006.01)
*H04L 51/02* (2022.01)
*H04L 51/216* (2022.01)

(52) U.S. Cl.
CPC ............ *H04L 51/216* (2022.05); *H04L 51/02* (2013.01)

(58) Field of Classification Search
CPC .............................. H04L 51/216; H04L 51/02
See application file for complete search history.

(56) References Cited

U.S. PATENT DOCUMENTS

2020/0099633 A1* 3/2020 D'Agostino .......... G06F 3/0481
2020/0175117 A1* 6/2020 Tsuji ....................... G06F 40/30
2024/0321267 A1* 9/2024 Voigt ...................... H04L 51/02
2025/0245233 A1* 7/2025 Jain ................... G06F 16/24578
2025/0245446 A1* 7/2025 Ayed ................. G06F 16/90332

* cited by examiner

*Primary Examiner* — John B Walsh
(74) *Attorney, Agent, or Firm* — Chamberlain, Hrdlicka, White, Williams & Aughtry; Aly Z. Dossa

(57) ABSTRACT

A method for processing user queries includes providing a processed user query to an LLM. The method includes generating, by the LLM a list of domain candidates and assigning, by the LLM, a confidence score to each domain candidate in the list of domain candidates. The method includes making a first determination that there is a previous domain and making a second determination that the domain candidate is different than the previous domain. The method includes making a third determination that the domain candidate does not correspond to a follow-up domain and switching the previous domain to the domain candidate. The method includes erasing any previous conversation history and providing the processed user query to a RAG application, obtaining relevant information and providing the relevant information and the processed user query to the LLM, and generating output and providing the output to a user via a user interface.

20 Claims, 9 Drawing Sheets

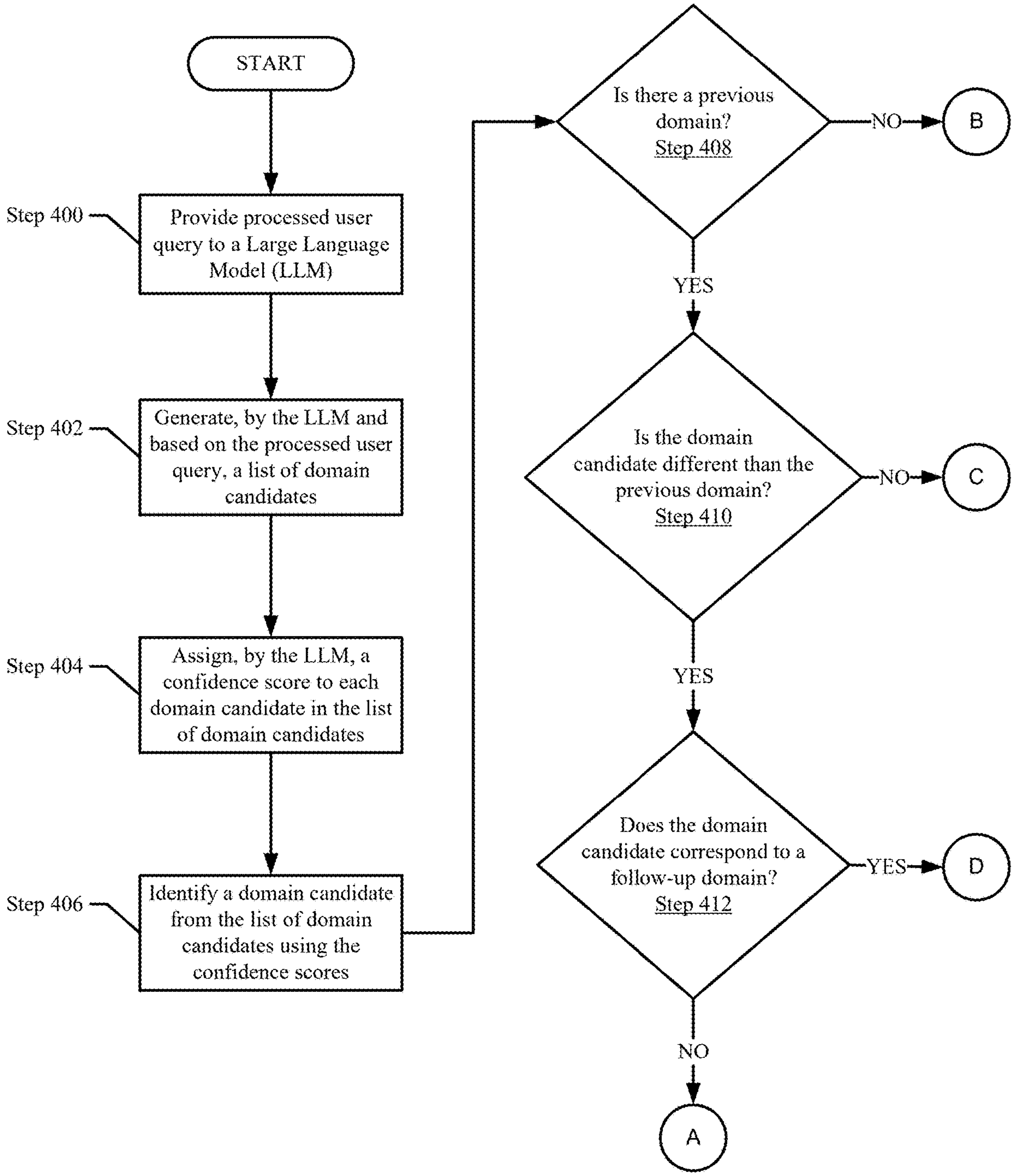
FIG. 4.1

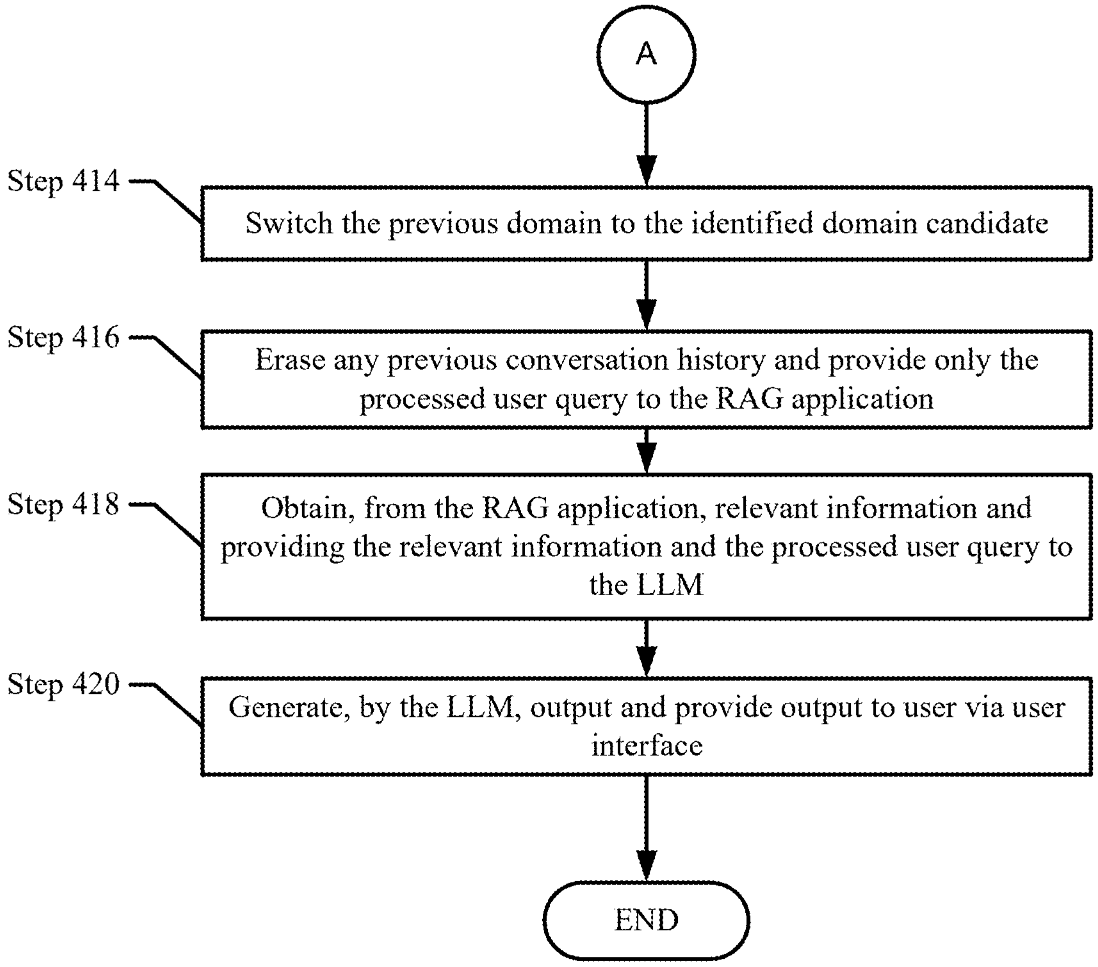
FIG. 4.2

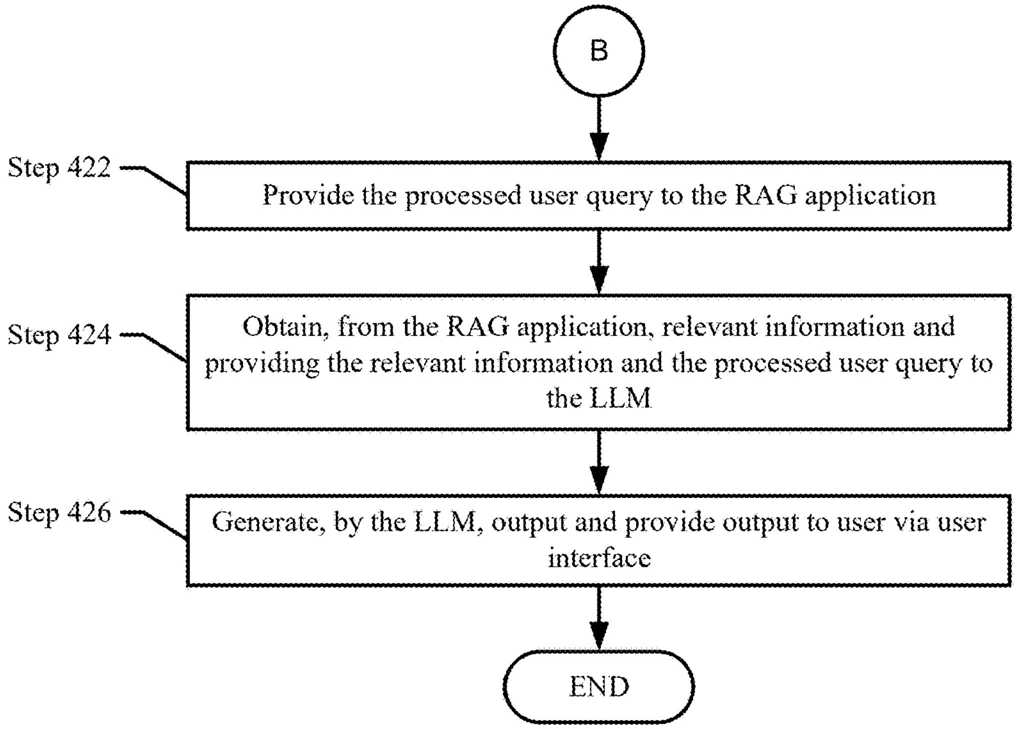
FIG. 4.3
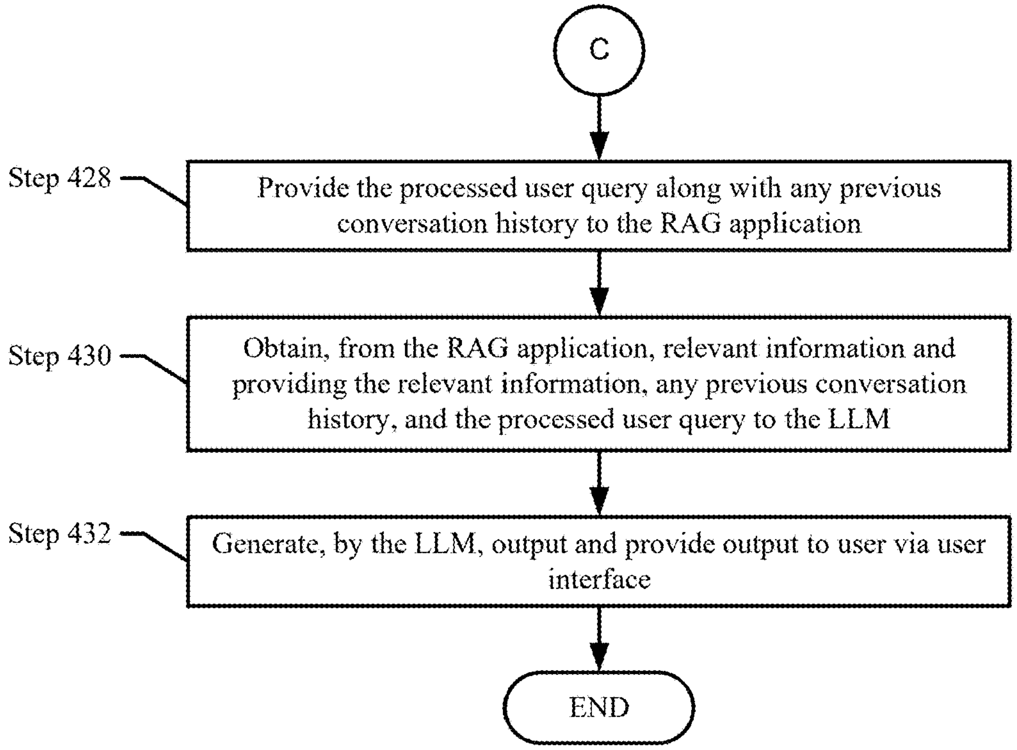
FIG. 4.4

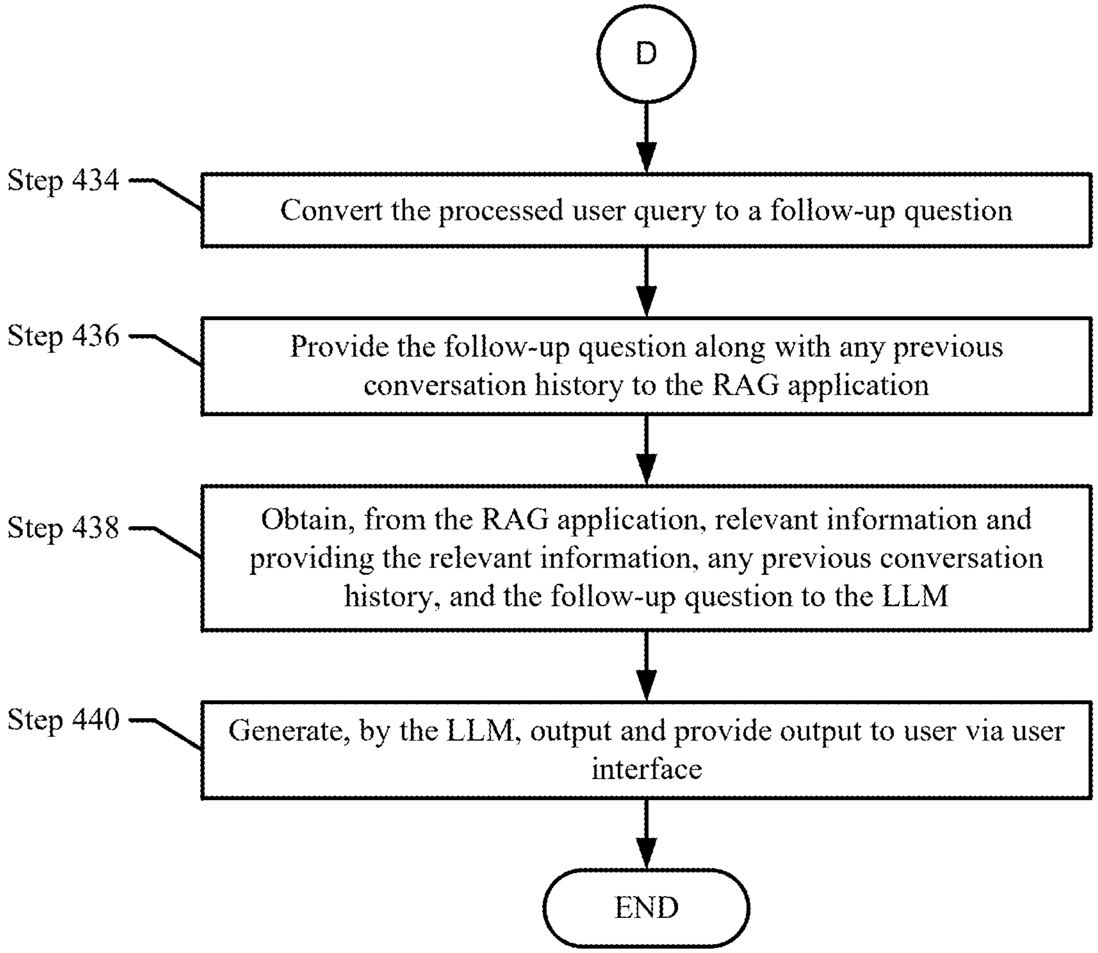
FIG. 4.5

INTELLIGENT HISTORY MANAGEMENT IN CHATBOTS

BACKGROUND

Maintaining context from previous interactions is crucial for a Large Language Model (LLM) to generate accurate answers. However, existing approaches cannot detect the context of previous interactions or when a user desires to switch the context, resulting in hallucinations.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

FIG. 4.1 shows a flowchart of a method for dynamically managing domain switching based on user queries in accordance with one or more embodiments of the invention.

FIG. 4.2 shows a flowchart of a method for switching the previous domain to the identified domain candidate in accordance with one or more embodiments of the invention.

FIG. 4.3 shows a flowchart of a method for providing the processed user query to the RAG application when a previous domain does not exist in accordance with one or more embodiments of the invention.

FIG. 4.4 shows a flowchart of a method for providing the processed user query along with any previous conversation history to the Retrieval Augmented Generation (RAG) application in accordance with one or more embodiments of the invention.

FIG. 4.5 shows a flowchart of a method for converting the processed user query to a follow-up question in accordance with one or more embodiments of the invention.

DETAILED DESCRIPTION

Figure 1:
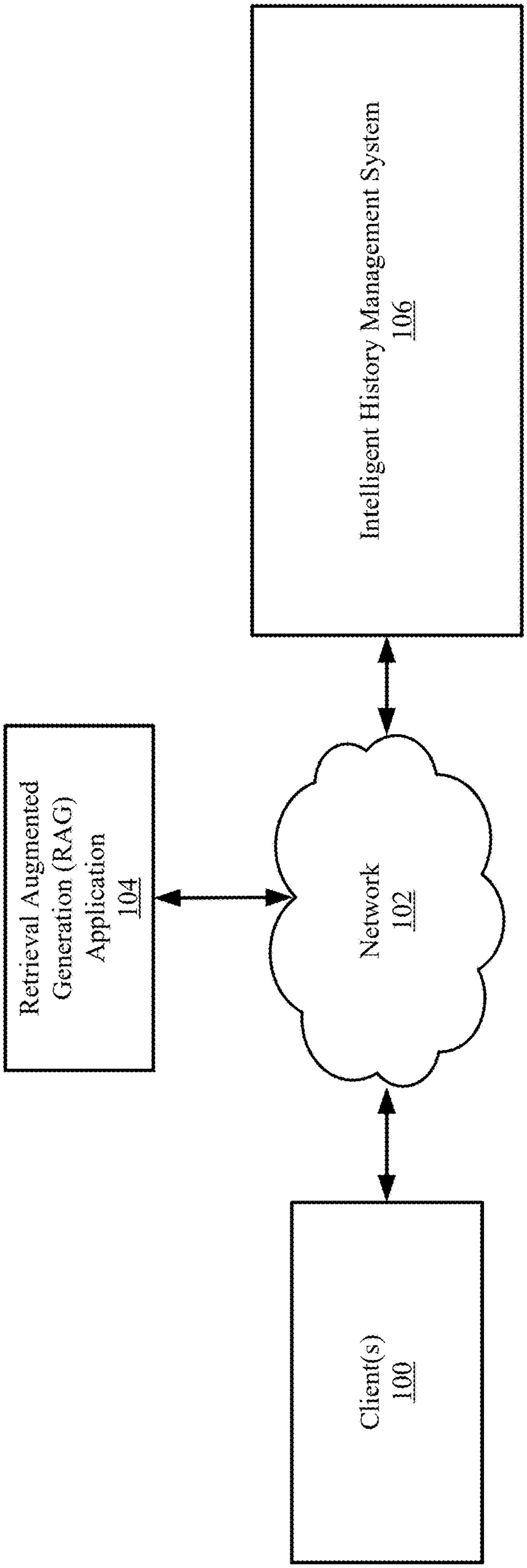
FIG. 1 shows a diagram of a system in accordance with one or more embodiments of the invention.

In Retrieval Augmented Generation (RAG) applications, maintaining the context of previous interactions between the user and the LLM is crucial for generating accurate and relevant answers after each new user query. However, when the context is misunderstood or irrelevant but still utilized by the RAG application to provide relevant information to the LLM, it leads to hallucinations. These are instances where the model generates responses based on unrelated context.

For example, consider a scenario in which a user starts a chatbot conversation (hereafter "conversation") by asking questions related to virtual private networking (VPN) configurations, and then immediately afterwards, the user asks about resetting their system password. Traditional approaches to conversation history management might still refer to the VPN domain when generating an answer in response to the user query about their system password, potentially leading to a non-useful response and/or a hallucinations. When the user encounters such responses, they tend to resort to manually starting a new chat to reset the context. This adds unnecessary steps to their interaction with the LLM, increasing frustration and hindering user experience. Further, this also leads to a loss in efficiency and effectiveness of the RAG application assisting the LLM.

A current approach to storing history for RAG applications in intelligent history management systems is "Direct Passing of Chat History". In this traditional method, after obtaining the relevant context from the RAG application, the conversation history and the user query is passed to the LLM for answer generation. The conversation history can be passed in three different ways. First, the conversation history is passed unaltered, where it is passed to the LLM directly without any modifications. Second, the conversation history may be summarized before getting passed to the LLM. This helps in condensing useful information. Finally, the conversation history may be passed in a hybrid form, where the newer conversations are stored as it is while the older conversations are summarized. However, in this last approach, answer generation by the LLM is mostly done after retrieving the context. For example, when a user asks a follow-up question, the follow-up question might not be a complete question and would retrieve irrelevant results, defeating the whole purpose.

Another existing approach is "Formulation of the Standalone Question". In this traditional method, the complete conversation history along with the user query is used to formulate a standalone question. The standalone question is formulated in such a way that it can be understood without referring to the previous history. However, in this approach, the LLM may hallucinate as it would try to incorporate all the questions, relevant or not, asked in the conversation in order to form a single question. For example, consider a scenario in which the user asks the first question, "How can I connect to VPN", which relates to VPN management. The user then asks a second question, "Is there any links?" This second question is converted, using the aforementioned approach, to a standalone question. Here, the standalone question may be "Is there any link to connect to VPN?" At this point, the user may then want to switch topics, and ask about system password management, writing "How can I reset my system password?" Converting this third question to a standalone question, by using the entire conversation history, may result in the following question "Is there any link to reset my VPN password?". Consequently, the LLM reverts back to the VPN management topic.

The limitations of the traditional approaches to chat history management result in inaccurate (or unhelpful) responses and hallucinations by the LLM. For at least the reasons discussed above, a fundamentally different approach is needed to address these challenges and improve the accuracy and efficiency of answer generation. Embodiments of the invention relate to a method for processing user queries. As a result of the processes discussed below, one or more embodiments disclosed herein ensures that user queries are accurately handled and that the history interference is utilized when required. This reduces hallucinations to a greater extent, and increases user experience by minimizing the number of times the user manually has to reset the chat history.

Specific embodiments will now be described with reference to the accompanying figures.

FIG. 1 shows a system in accordance with one or more embodiments of the invention. The system may include any number of clients (100), a network (102), an intelligent history management system (106), and a retrieval augmented generation (RAG) application (104). The system may include additional, fewer, and/or different components without departing from the scope of the invention. Each component may be operably/operatively connected to any of the other components via any combination of wired and/or wireless connections. Each of these system components is described below.

In one or more embodiments, the client(s) (100) and the intelligent history management system (106) may be operatively connected to one another through a network (102) (e.g., a local area network (LAN), a wide area network (WAN) such as the Internet, a mobile network, any other network type, or a combination thereof). The network (102) may be implemented using any combination of wired and/or wireless connections. Further, the network (102) may encompass various interconnected, network-enabled subcomponents (or systems) (e.g., switches, routers, gateways, etc.) that may facilitate communications between the client (s) (100) and the intelligent history management system (106). Moreover, the client(s) (100) and the intelligent history management system (106) may communicate with one another using any combination of wired and/or wireless communication protocols.

In one or more embodiments, the intelligent history management system (106) and the retrieval augmented generation (RAG) application (104) may be operatively connected to one another through a network (102) (e.g., a local area network (LAN), a wide area network (WAN) such as the Internet, a mobile network, any other network type, or a combination thereof). The intelligent history management system (106) may be located on a single physical and/or logical computing system.

In one or more embodiments, the client(s) (100) includes functionality to permit users to interact with the intelligent history management system (106). Further, the client(s) (100) includes functionality to perform at least a portion of the methods shown in FIGS. 3-5. One of ordinary skill will appreciate that the client(s) (100) may perform other functionalities without departing from the scope of the invention.

In one or more embodiments disclosed herein, the client (s) (100) may be a physical device or a virtual device (i.e., a virtual machine executing on one or more physical devices) such as a personal computing system (e.g., a laptop, a cell phone, a tablet computer, a virtual machine executing on a server, etc.) of a user. For example, the client(s) (100) may be a computing system (e.g., 600, FIG. 6) as discussed below in more detail in FIG. 6.

In one or more embodiments, the RAG application (104) includes functionality to retrieve relevant information based on the user query and/or conversation history it is provided. The relevant information retrieved by the RAG application (104) is then passed to the LLM (e.g., Large Language Model (LLM) (206), FIG. 2). Further, the RAG application (104) includes functionality to perform at least a portion of the methods shown in FIGS. 4.2-4.5. One of ordinary skill will appreciate that the RAG application (104) may perform other functionalities without departing from the scope of the invention.

In one or more embodiments disclosed herein, the RAG application (104) may be a physical device or a virtual device (i.e., a virtual machine executing on one or more physical devices) such as a personal computing system (e.g., a laptop, a cell phone, a tablet computer, a virtual machine executing on a server, etc.) of a user. For example, the RAG application (104) may be implemented on a computing system (e.g., 600, FIG. 6) as discussed below in more detail in FIG. 6.

In one or more embodiments, the intelligent history management system (106) includes functionality to process user queries by utilizing large language model (LLM) capabilities and integrating output from the RAG application (104). In one or more embodiments, the intelligent history management system (106) has an "intent detection for history switching" component (i.e., a switching module (202)), which enhances the RAG application (104) by dynamically managing context based on the user queries. In one or more embodiments, the intelligent history management system (106) tracks current conversation domains and maps user intent to specific domains by recognizing shifts in topics. It then determines whether to retain the existing conversation history and pass it to the RAG application (104) or switch to a new domain and provide only the user query to the RAG application (104). As a result, the RAG application (104) is provided the relevant information needed to retrieve relevant context, which then assists the LLM to generate accurate answers. By accurately identifying the intent of the user query, relevant context is retrieved by the RAG application (104), which reduces hallucinations produced by irrelevant context. In one or more embodiments, the intelligent history management system (106) ensures that user queries are accurately handled. Further, it ensures that the history interference in response is utilized when required. This reduces hallucinations by the LLM. In one or more embodiments, the intelligent history management system (106) is an adaptive system that learns from user interactions and feedback. By incorporating user feedback, the intelligent history management system (106) improves its ability to detect the intent of the user query, leading to a more personalized and efficient experience. One of ordinary skill will appreciate that the intelligent history management system (106) may perform other functionalities without departing from the scope of the invention.

In one or more embodiments disclosed herein, the intelligent history management system (106) may be a physical device or a virtual device (i.e., a virtual machine executing on one or more physical devices) such as a personal computing system (e.g., a laptop, a cell phone, a tablet computer, a virtual machine executing on a server, etc.) of a user. For example, the intelligent history management system (106) may be implemented on a computing system (e.g., 600, FIG. 6) as discussed below in more detail in FIG. 6.

Additional detail regarding one or more embodiments of the intelligent history management system (106) is described below in FIG. 2.

Figure 2:
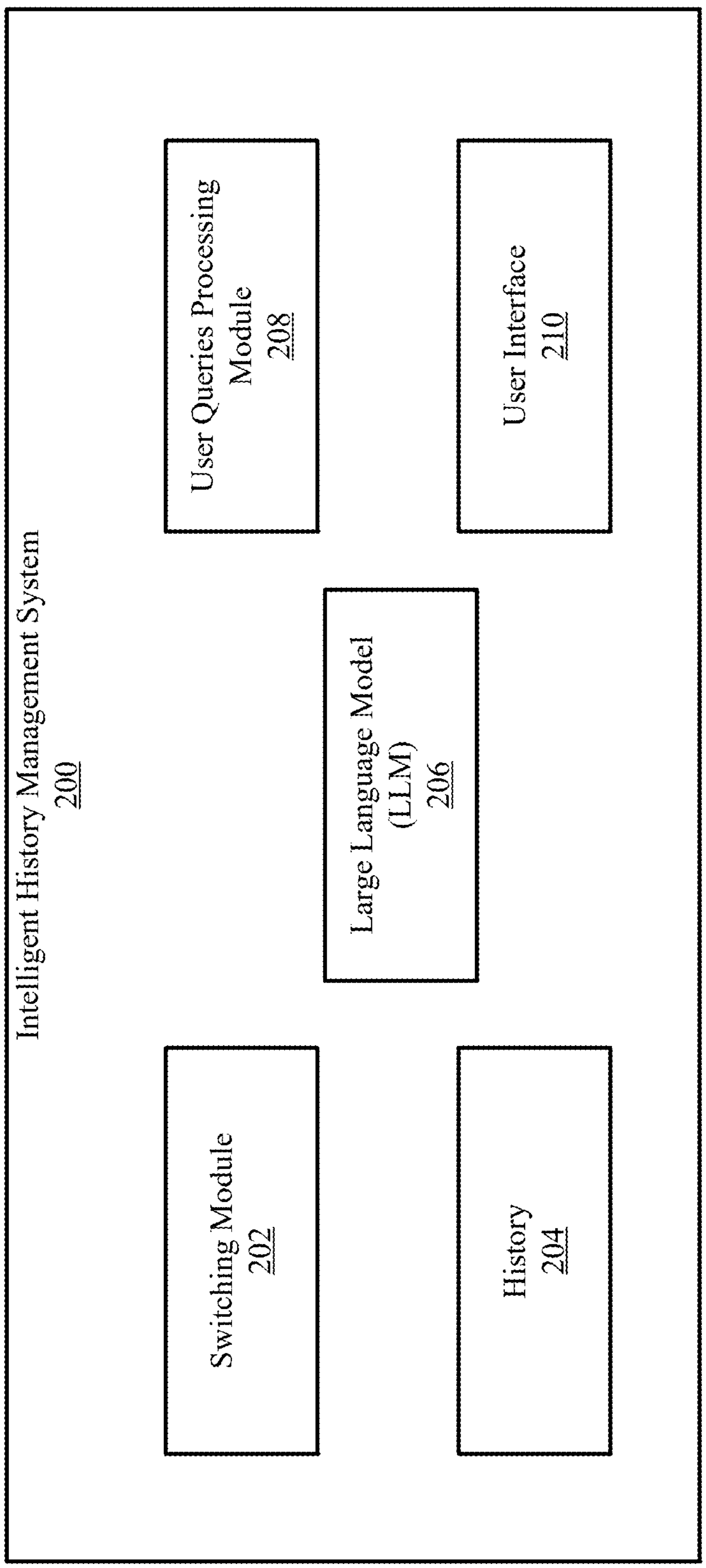
FIG. 2 shows a diagram of an intelligent history management system in accordance with one or more embodiments of the invention.

Turning to FIG. 2, FIG. 2 shows an intelligent history management system (200) in accordance with one or more embodiments of the invention. The intelligent history management system (200) includes a switching module (202), history (204), a large language model (LLM) (206), a user queries processing module (208), and a user interface (210). Each of these components is described below.

In one or more embodiments, the switching module (202) includes functionality to determine whether the previous domain should switch to a new domain. In one or more embodiments, the switching module (202) supports the LLM (206) when making this determination. In one or more embodiments, after the switching module (202) makes a decision on whether the previous domain should switch to a new domain, the switching module (202) passes the user input and, if applicable, any previous conversation history (e.g., stored in history (204)) to the RAG application (104, FIG. 1). One of ordinary skill will appreciate that the switching module (202) may perform other functionalities without departing from the scope of the invention.

In one or more embodiments, the history (204) includes functionality to maintain a record of the conversations between the client(s) (100, FIG. 1) and the LLM (206). In one or more embodiments, the history (204) also associates each conversation with a specific domain. The history (204) assists the intelligent history management system (200) to recognize when the client(s) (100, FIG. 1) shifts to a different domain during the conversation. One of ordinary skill will appreciate that the history (204) may perform other functionalities without departing from the scope of the invention.

In one or more embodiments, the LLM (206) includes functionality to classify the intent or domain from a processed user query along with a confidence score to make an informed decision when switching domains. Based on the classifying, an engineered prompt is written with specific instructions and provided to the LLM (206) to generate a list of domain candidates based on the processed user query. In one or more embodiments, the LLM (206) assigns confidence scores to the domain candidates. In one or more embodiments, the LLM also includes functionality to generate responses based on user input and, if applicable, any previous conversation history (e.g., history (204)). In one or more embodiments, the LLM (206) collaborates with the RAG application (104, FIG. 1) by receiving relevant information from the RAG application (104, FIG. 1) to generate more accurate responses to the user queries. One of ordinary skill will appreciate that the LLM (206) may perform other functionalities without departing from the scope of the invention.

In one or more embodiments, the user queries processing module (208) includes functionality to analyze user queries. In one or more embodiments, user queries are user input received via a client (e.g., client(s) (100, FIG. 1)). A user query may be in the form of text, audio, video, touch, motion or any combination thereof. As a non-limiting example, consider a scenario in which a client wants to start a chatbot conversation by asking questions related to VPN configurations. The client submits "Unable to context to VPN. Suggest some steps" as the user query. In one or more embodiments, the user queries processing model (208) pre-processes the original user query by removing noise from the original user query. In one or more embodiments, the user queries processing module (208) also includes functionality to process the pre-processed user query by extracting key features. One of ordinary skill will appreciate that the user queries processing module (208) may perform other functionalities without departing from the scope of the invention.

In one or more embodiments, the user interface (210) includes functionality to facilitate communications between the LLM (206) and the user (e.g. client(s) (100, FIG. 1)). In one or more embodiments, the user interface (210) may take the form of a chatbot or similar interface. One of ordinary skill will appreciate that the user interface (210) may perform other functionalities without departing from the scope of the invention.

Figure 3:
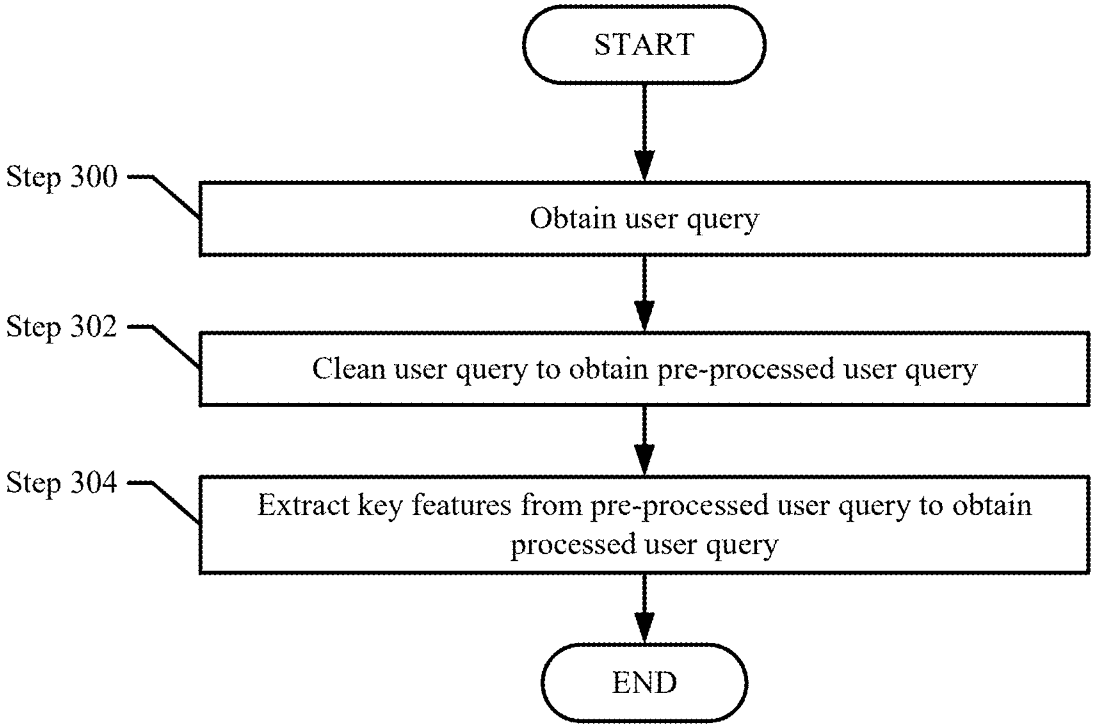
FIG. 3 shows a flowchart of a method for obtaining processed user queries in accordance with one or more embodiments of the invention.

Turning to FIG. 3, FIG. 3 shows a flowchart of a method for obtaining processed user queries. The method may be performed by, for example, the intelligent history management system (200, FIG. 2). Other components in the system may perform this method without departing from the invention.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 3 may be performed concurrently with one or more steps in FIGS. 4.1-5.

In step 300, a user query is obtained. In one or more embodiments, the user query is provided via a client (e.g., client(s) (100, FIG. 1)). In one or more embodiments, the user query is obtained by the user queries processing module (e.g., user queries processing module (208, FIG. 2)). As a non-limiting example, a user may want to ask questions related to VPN configurations. In this example, the user may write "I am unable to connect to VPN."

In step 302, the user query is cleaned to obtain a pre-processed user query. In one or more embodiments, the user queries processing module (e.g., user queries processing module (208, FIG. 2)) cleans the user query by removing noise, such as punctuation, capitalization, and irrelevant symbols. This assists the LLM (e.g., LLM (206, FIG. 2)) to focus on the key elements of the user's input that are essential to the intent of the user. As a non-limiting example, the user may provide the following query "I am unable to connect to VPN." Here, the 'I' at the beginning of the sentence is converted to lowercase, VPN is converted to lowercase, and the period at the end of the sentence is removed. The resulting pre-processed query is "i am unable to connect to vpn".

In step 304, key features are extracted from the pre-processed user query to obtain a processed user query. In one or more embodiments, the user queries processing module (e.g., user queries processing module (208, FIG. 2)) extracts key features from the pre-processed user query. Key features include, but are not limited to, important keywords, phrases, and/or syntactic structures. Extracting key features from the pre-processed user query helps in determining the primary intent of the user query.

Turning to FIG. 4.1, FIG. 4.1 shows a flowchart of a method for dynamically managing domain switching based on user queries. The method may be performed by, for example, the intelligent history management system (200, FIG. 2). Other components in the system may perform this method without departing from the invention.

While various steps in the flowchart shown in FIG. 4.1 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 4.1 may be performed concurrently with one or more steps in FIGS. 3 and 4.2-5.

In step 400, the processed user query is provided to a Large Language Model (LLM) (e.g., LLM (206, FIG. 2)). As a non-limiting example, the processed user query may be "i am unable to connect to vpn".

In step 402, a list of domain candidates is generated, based on the processed user query, by the LLM (e.g., LLM (206, FIG. 2)). As a non-limiting example, the list of domain candidates generated by the LLM may consist of 'VPN', 'Follow-up', and 'Password'. The first domain candidate, VPN, describes a domain related to information only regarding VPNs. The second domain candidate, Follow-up, is a follow-up domain. The follow-up domain signifies that the processed user query is not of any domain but rather a follow-up question. The third domain candidate, Password, describes a domain related to information only regarding passwords. The invention is not limited to these three domains.

In step 404, a confidence score is assigned by the LLM to each domain candidate in the list of domain candidates. In one or more embodiments, the confidence score associated with each domain candidate indicates the likelihood that the domain is accurate. This scoring assists in making more informed decisions about domain switching. In one or more embodiments, the confidence score ranges from 0 to 1. Continuing with the example list of domain candidates above, 'VPN' may receive a confidence score of 0.96, 'Follow-up' may receive a confidence score of 0.65, and 'Password' may receive a confidence score of 0.43.

In step 406, a domain candidate is identified from the list of domain candidates using the confidence scores. In one or more embodiments, the identified domain candidate has the highest confidence score amongst the other domain candidates. In one or more embodiments, the identified domain candidate is the domain of the processed user query. Continuing with the example list of domain candidates above, 'VPN' has the highest confidence score out of the other two domain candidates. Therefore, 'VPN' is the identified domain candidate.

In step 408, a determination is made as to whether there is a previous domain. If there was a prior processed user query, the previous domain is the domain of the prior processed user query. If there was no prior processed user query and the original processed user query is the start of the conversation, a previous domain does not exist. Accordingly, in one or more embodiments, if the result of the determination is a YES, the method proceeds to step 410. In one or more embodiments, if the result of the determination is a NO, the method may proceed to FIG. 4.3.

In step 410, a determination is made as to whether the domain candidate is different than the previous domain. Accordingly, in one or more embodiments, if the result of the determination is a YES, the method proceeds to step 412. In one or more embodiments, if the result of the determination is a NO, the method may proceed to FIG. 4.4.

In step 412, a determination is made as to whether the domain candidate corresponds to a follow-up domain. Accordingly, in one or more embodiments, if the result of the determination is a YES, the method may proceed to FIG. 4.5. In one or more embodiments, if the result of the determination is a NO, the method may proceed to FIG. 4.2.

Turning to FIG. 4.2, FIG. 4.2 shows a flowchart of a method for switching the previous domain to the identified domain candidate. In one or more embodiments, the domain of the processed user query is different than the previous domain, resulting in a domain switch. The method may be performed by, for example, the intelligent history management system (200, FIG. 2). Other components in the system may perform this method without departing from the invention.

While various steps in the flowchart shown in FIG. 4.2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 4.2 may be performed concurrently with one or more steps in FIGS. 3-4.1 and 4.3-5.

In step 414, the previous domain is switched to the identified domain candidate. In one or more embodiments, the switching module (e.g., switching module (202, FIG. 2)) utilizes a switching module to switch from the previous domain to the identified domain candidate. As a non-limiting example, if the previous domain was 'VPN', it suggests that the user was previously inquiring about information regarding VPNs. If the identified domain candidate is 'Password', the system switches from the domain 'VPN' to the domain 'Password'.

In step 416, any previous conversation history is erased and only the processed user query is provided to the RAG application (e.g. RAG application (104, FIG. 1)). In one or more embodiments, the previous conversation history is erased to ensure that the history (e.g., history (204, FIG. 2)) does not interfere during context retrieval by the RAG application or during answer generation by the LLM (e.g., LLM (206, FIG. 2)). This reduces the likelihood of hallucinations by the LLM.

In step 418, relevant information is obtained from the RAG application (e.g. RAG application (104, FIG. 1)) and the relevant information and the processed user query are provided to the LLM (e.g. LLM (206, FIG. 2)). As a non-limiting example, the information retrieved by the RAG application is relevant only to the processed user query. The additional and precise context provided by the RAG application increases the accuracy of answer generation by the LLM.

In step 420, output is generated by the LLM (e.g. LLM (206, FIG. 2)) and provided to the user via the user interface (e.g. user interface (210, FIG. 2)).

The method may end following step 420.

Turning to FIG. 4.3, FIG. 4.3 shows a flowchart of a method for providing the processed user query to the RAG application when a previous domain does not exist. The method may be performed by, for example, the intelligent history management system (200, FIG. 2). Other components in the system may perform this method without departing from the invention.

While various steps in the flowchart shown in FIG. 4.3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 4.3 may be performed concurrently with one or more steps in FIGS. 3-4.2 and 4.4-5.

In step 422, the processed user query is provided to the RAG application (e.g. RAG application (104, FIG. 1)). In one or more embodiments, there is no conversation history (e.g., history (204, FIG. 2)) that can interfere during context retrieval by the RAG application and answer generation by the LLM. Therefore, only the processed user query is passed to the RAG application.

In step 424, relevant information is obtained from the RAG application (e.g. RAG application (104, FIG. 1)) and the relevant information and processed user query is provided to the LLM (e.g. LLM (206, FIG. 2)). In one or more embodiments, the information retrieved by the RAG application is relevant only to the processed user query. The additional and (more) precise context provided by the RAG application increases the accuracy of answer generation by the LLM.

In step 426, output is generated by the LLM (e.g. LLM (206, FIG. 2)) and the output is provided to the user via the user interface (e.g. user interface (210, FIG. 2)).

The method may end following step 426.

Turning to FIG. 4.4, FIG. 4.4 shows a flowchart of a method for providing the processed user query along with any previous conversation history to the RAG application. In one or more embodiments, the identified domain candidate and the previous domain are the same. The method may be performed by, for example, the intelligent history management system (200, FIG. 2). Other components in the system may perform this method without departing from the invention.

While various steps in the flowchart shown in FIG. 4.4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 4.4 may be performed concurrently with one or more steps in FIGS. 3-4.3 and 4.5-5.

In step 428, the processed user query is provided to the RAG application (e.g. RAG application (104, FIG. 1)) along with any previous conversation history. In one or more embodiments, the previous conversation history is also provided to the RAG application because the domain has not changed. If the domain of the processed user query aligns with the previous domain, the existing history is preserved to provide additional context for the RAG application.

In step 430, relevant information is obtained from the RAG application (e.g. RAG application (104, FIG. 1)). The relevant information, processed user query, and any previous conversation history is provided to the LLM (e.g. LLM (206, FIG. 2)). In one or more embodiments, the information retrieved by the RAG application is relevant to the processed user query and the previous conversation history. In one or more embodiments, the relevant information retrieved by the RAG application, the processed user query, and the previous conversation history are all passed to the LLM to increase the accuracy of answer generation.

In step 432, output is generated by the LLM (e.g. LLM (206, FIG. 2)) and the output is provided to the user via the user interface (e.g. user interface (210, FIG. 2)).

The method may end following step 432.

Turning to FIG. 4.5, FIG. 4.5 shows a flowchart of a method for converting the processed user query to a follow-up question. In one or more embodiments, the identified domain candidate corresponds to a follow-up domain. In one or more embodiments, a processed user query classified under a follow-up domain signifies that the question asked by the user is not of any domain but rather a follow-up question. The method may be performed by, for example, the intelligent history management system (200, FIG. 2). Other components in the system may perform this method without departing from the invention.

While various steps in the flowchart shown in FIG. 4.5 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 4.5 may be performed concurrently with one or more steps in FIGS. 3-4.4 and 5.

In step 434, the processed user query is converted to a follow-up question. As a non-limiting example, consider a scenario in which the previous user query was "i am unable to connect to vpn". The user may then submit another query, such as "are there any links available". After the second query is identified under the follow-up domain, the query is then converted to a follow up question, which is associated the domain of the previous user query. Here, the follow-up question may write "Are there any links to connect to VPN?" This helps in the correct retrieval of relevant information by the RAG application (e.g., RAG application (104, FIG. 1)).

In step 436, the follow-up question along with any previous conversation history is provided to the RAG application (e.g. RAG application (104, FIG. 1)). In one or more embodiments, the previous conversation history is also provided to the RAG application because the domain is a follow-up domain. Therefore, the intent of the user is still the same. If the domain of the processed user query is a follow-up domain, the intent of the query still aligns with the previous domain and the existing history is preserved to provide additional context for the RAG application.

In step 438, relevant information is obtained from the RAG application (e.g. RAG application (104, FIG. 1)). The relevant information, follow-up question and any previous conversation history is provided to the LLM (e.g. LLM (206, FIG. 2)). In one or more embodiments, the information retrieved by the RAG application is relevant to the follow-up question and the previous conversation history. In one or more embodiments, the relevant information retrieved by the RAG application, the follow-up question, and the previous conversation history are all passed to the LLM to increase the accuracy of answer generation.

In step 440, output is generated by the LLM (e.g. LLM (206, FIG. 2) and the output is then provided to the user via the user interface (user interface (210, FIG. 2)).

The method may end following step 440.

Figure 5:
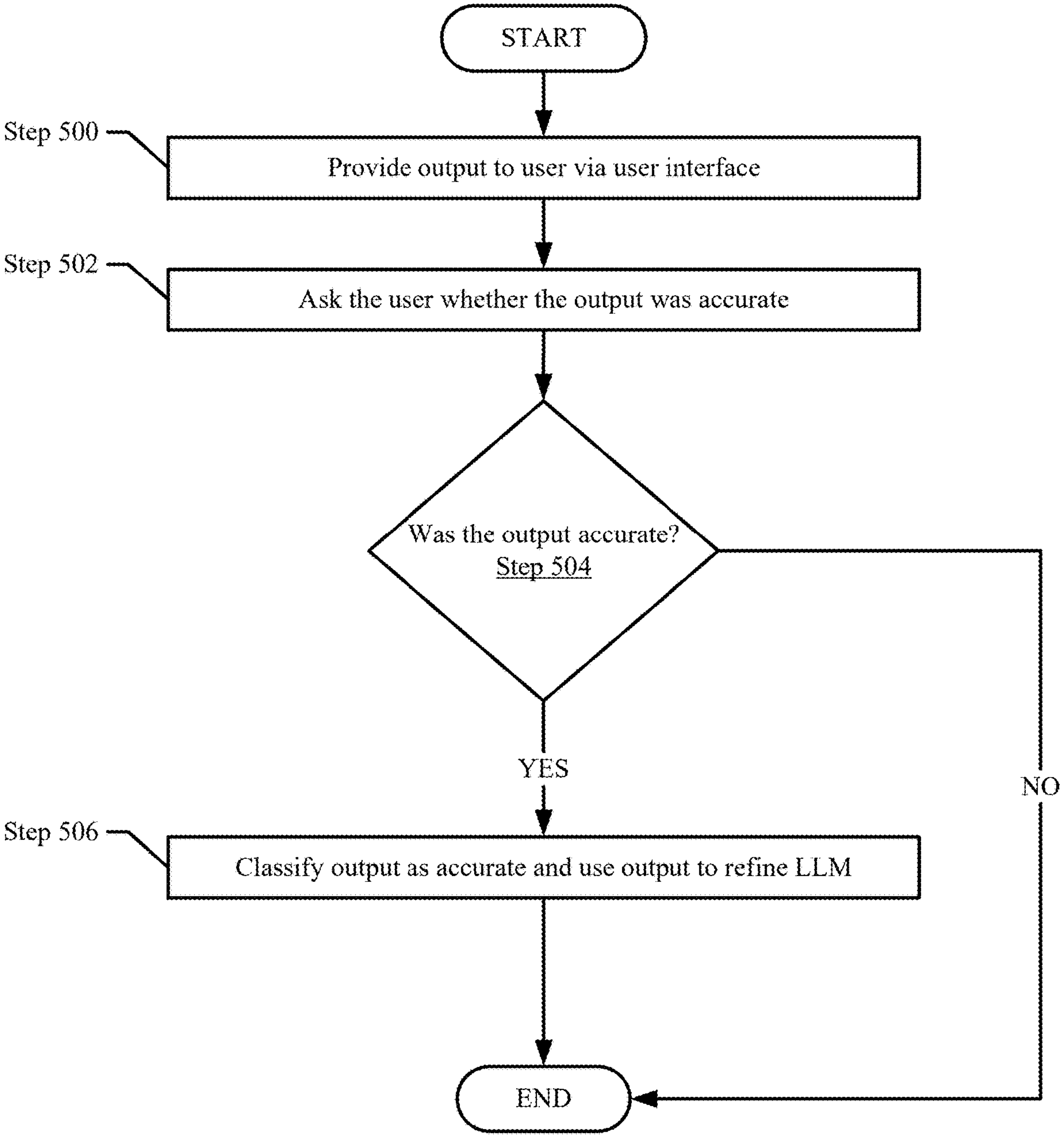
FIG. 5 shows a flowchart of a method for using output generated by the LLM to refine the LLM in accordance with one or more embodiments of the invention.

Turning to FIG. 5, FIG. 5 shows a flowchart of a method for utilizing output generated by the LLM (e.g. LLM (206, FIG. 2)) to refine the LLM. The method may be performed by, for example, the intelligent history management system (200, FIG. 2). Other components in the system may perform this method without departing from the invention.

While various steps in the flowchart shown in FIG. 5 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 5 may be performed concurrently with one or more steps in FIGS. 3-4.5.

In step 500, output is provided to the user via the user interface (e.g. user interface (210, FIG. 2)).

In step 502, the user is asked whether the output was accurate. In one or more embodiments, the LLM (e.g. LLM (206, FIG. 2)) may incorporate a voting mechanism so that users can vote a thumbs up or a thumbs down when asked whether the output was accurate. A thumbs up signifies the output is accurate, whereas a thumbs down signifies the output is inaccurate.

In step 504, a determination is made as to whether the output is accurate. Accordingly, in one or more embodiments, if the result of the determination is a YES, the method proceeds to step 506. In one or more embodiments, if the result of the determination is a NO, the method may end following step 504.

In step 506, the output is classified as accurate. The output is then used to refine the LLM (e.g. LLM (206, FIG. 2)). This feedback is used by the LLM to continuously refine itself and improve future interactions. In one or more embodiments, the LLM learns to better recognize user intent and adjust its context management efficiently.

The method may end following step 506.

Figure 6:
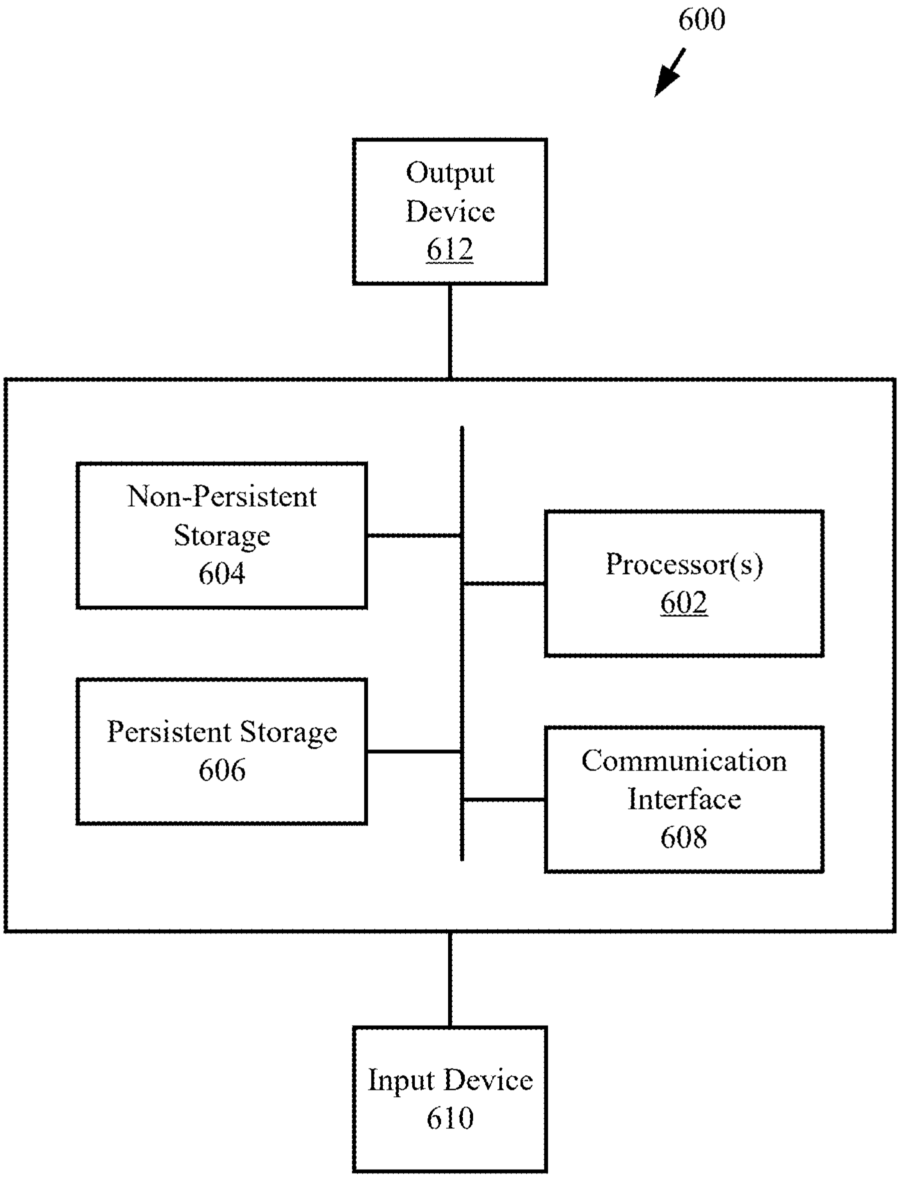
FIG. 6 shows a computing system in accordance with one or more embodiments of the invention.

Embodiments of the disclosure may be implemented using computing devices. FIG. 6 shows a diagram of a computing device (600) in accordance with one or more embodiments. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (608) (e.g., Bluetooth interface, infrared interface, network interface, optical interface, etc.), input devices (610), output devices (612), and numerous other elements (not shown) and functionalities. Each of these components is described below.

In one embodiment, the computer processor(s) (602) may be an integrated circuit for processing instructions. For example, the computer processor(s) (602) may be one or more cores or micro-cores of a processor. The computing device (600) may also include one or more input devices (610), such as a touchscreen, keyboard, mouse, microphone, touchpad, electronic pen, or any other type of input device. The communication interface (508) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment, the computing device (600) may include one or more output devices (612), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) (610, 612) may be locally or remotely connected to the computer processor(s) (602), nonpersistent storage (604), and persistent storage (606). Many diverse types of computing devices exist, and the aforementioned input and output device(s) (610, 612) may take other forms.

The problems discussed above should be understood as being examples of problems solved by embodiments of the disclosure and the disclosure should not be limited to solving the same/similar problems. The disclosed disclosure is broadly applicable to address a range of problems beyond those discussed herein.

In the detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the prior description of the figures, any component described with regard to a figure, in various embodiments of the invention, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure have one or more like-named components. Additionally, in accordance with various embodiment of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for processing user queries, the method comprising:

providing a first processed user query to a large language model (LLM), wherein the first processed user query is associated with a user;

generating, by the LLM and based on the first processed user query, a first list of domain candidates;

assigning, by the LLM, a first confidence score to each domain candidate in the first list of domain candidates;

identifying a first domain candidate from the first list of domain candidates using the first confidence scores;

making a first determination that there is a previous domain, wherein the previous domain is associated with another user query previously provided by the user;

making a second determination, based on the first determination, that the first domain candidate is different than the previous domain;

making a third determination, based on the second determination, that the first domain candidate does not correspond to a follow-up domain;

switching, based on the third determination, the previous domain to the first domain candidate;

in response to the switching:

erasing any previous conversation history associated with the another user query previously provided by the user and providing only the first processed user query to a Retrieval Augmented Generation (RAG) application;

obtaining, from the RAG application and based on the first processed user query, relevant information and providing the relevant information and the first processed user query to the LLM; and generating, by the LLM and in response to the obtaining, output and providing the output to the user via a user interface.

2. The method of claim 1, the method further comprising:

prior to providing the first processed user query to the LLM:

obtaining a user query from the user via the user interface;

cleaning the user query to obtain a pre-processed user query; and extracting key features from the pre-processed user query to obtain the first processed user query.

3. The method of claim 1, the method further comprising:

providing a second processed user query to the LLM, wherein the second processed user query is associated with a second user;

generating, by the LLM and based on the second processed user query, a second list of domain candidates;

assigning, by the LLM, a second confidence score to each domain candidate in the second list of domain candidates;

identifying a second domain candidate from the second list of domain candidates using the second confidence scores;

making a fourth determination that there is not a previous domain associated with the second user;

in response to the fourth determination:

providing the second processed user query to the RAG application;

obtaining, from the RAG application and based on the second processed user query, relevant information and providing the relevant information and the second processed user query to the LLM; and generating, by the LLM and in response to the obtaining, output and providing the output to the second user via the user interface.

4. The method of claim 1, the method further comprising:

providing a second processed user query to the LLM associated with the user;

generating, by the LLM and based on the second processed user query, a second list of domain candidates;

assigning, by the LLM, a second confidence score to each domain candidate in the second list of domain candidates;

identifying a second domain candidate from the second list of domain candidates using the second confidence scores;

making a fourth determination that there is a previous domain associated with the first processed user query;

making a fifth determination, based on the fourth determination, that the second domain candidate is not different than the previous domain;

in response to the fifth determination:

providing the second processed user query and any previous conversation history associated with at least the first processed user query to the RAG application;

obtaining, from the RAG application and in response to the providing, relevant information and providing the relevant information, any previous conversation history associated with at least the first processed user query, and the second processed user query to the LLM; and generating, by the LLM and in response to the obtaining, output and providing the output to the user via the user interface.

5. The method of claim 1, the method further comprising:

providing a second processed user query to the LLM associated with the user;

generating, by the LLM and based on the second processed user query, a second list of domain candidates;

assigning, by the LLM, a second confidence score to each domain candidate in the second list of domain candidates;

identifying a second domain candidate from the second list of domain candidates using the second confidence scores;

making a fourth determination that there is a previous domain associated with the first processed user query;

making a fifth determination, based on the fourth determination, that the second domain candidate is different than the previous domain associated with the first processed user query;

making a sixth determination, based on the fifth determination, that the second domain candidate corresponds to a follow-up domain;

in response to the sixth determination:

converting the second processed user query to a follow-up question;

providing the follow-up question and any previous conversation history associated with at least the first processed user query to the RAG application;

obtaining, from the RAG application and based on the providing, relevant information and providing the relevant information, any previous conversation history associated with at least the first processed user query, and the follow-up question to the LLM; and generating, by the LLM and in response to the obtaining, output and providing the output to the user via the user interface.

6. The method of claim 1, the method further comprising:

after generating, by the LLM, output and providing the output to the user via the user interface:

asking the user via the user interface whether the output was accurate;

making a fourth determination that the output was accurate; and classifying, based on the fourth determination, the output as accurate and using the output to refine the LLM.

7. The method of claim 1, the method further comprising:

after generating, by the LLM, output and providing the output to the user via the user interface:

asking the user via the user interface whether the output was accurate;

making a fourth determination that the output is not accurate; and in response to the fourth determination, the output is not used to refine the LLM.

8. A non-transitory computer readable medium (CRM) comprising computer readable program code, which when executed by a computer processor, enables the computer to perform a method for processing user queries, the method comprising:

providing a first processed user query to a large language model (LLM), wherein the first processed user query is associated with a user;

generating, by the LLM and based on the first processed user query, a first list of domain candidates;

assigning, by the LLM, a first confidence score to each domain candidate in the first list of domain candidates;
identifying a first domain candidate from the first list of domain candidates using the first confidence scores;
making a first determination that there is a previous domain, wherein the previous domain is associated with another user query previously provided by the user;
making a second determination, based on the first determination, that the first domain candidate is different than the previous domain;
making a third determination, based on the second determination, that the first domain candidate does not correspond to a follow-up domain;
switching, based on the third determination, the previous domain to the first domain candidate;
in response to the switching:
erasing any previous conversation history associated with the another user query previously provided by the user and providing only the first processed user query to a Retrieval Augmented Generation (RAG) application; and
obtaining, from the RAG application, and based on the first processed user query, relevant information and providing the relevant information and the first processed user query to the LLM; and
generating, by the LLM and in response to the obtaining, output and providing the output to the user via a user interface.

9. The non-transitory CRM of claim 8, the method further comprising:
prior to providing the first processed user query to the LLM:
obtaining a user query from the user via the user interface;
cleaning the user query to obtain a pre-processed user query; and
extracting key features from the pre-processed user query to obtain the first processed user query.

10. The non-transitory CRM of claim 8, the method further comprising:
providing a second processed user query to the LLM, wherein the second processed user query is associated with a second user;
generating, by the LLM and based on the second processed user query, a second list of domain candidates;
assigning, by the LLM, a second confidence score to each domain candidate in the second list of domain candidates;
identifying a second domain candidate from the second list of domain candidates using the second confidence scores;
making a fourth determination that there is not a previous domain associated with the second user;
in response to the fourth determination:
providing the second processed user query to the RAG application; and
obtaining, from the RAG application and based on the second processed user query, relevant information and providing the relevant information and the second processed user query to the LLM; and
generating, by the LLM and in response to the obtaining, output and providing the output to the second user via the user interface.

11. The non-transitory CRM of claim 8, the method further comprising:
providing a second processed user query to the LLM associated with the user;
generating, by the LLM and based on the second processed user query, a second list of domain candidates;
assigning, by the LLM, a second confidence score to each domain candidate in the second list of domain candidates;
identifying a second domain candidate from the second list of domain candidates using the second confidence scores;
making a fourth determination that there is a previous domain associated with the first processed user query;
making a fifth determination, based on the fourth determination, that the second domain candidate is not different than the previous domain;
in response to the fifth determination:
providing the second processed user query and any previous conversation history associated with at least the first processed user query to the RAG application; and
obtaining, from the RAG application and in response to the providing, relevant information and providing the relevant information, any previous conversation history associated with at least the first processed user query, and the second processed user query to the LLM; and
generating, by the LLM and in response to the obtaining, output and providing the output to the user via the user interface.

12. The non-transitory CRM of claim 8, the method further comprising:
providing a second processed user query to the LLM associated with the user;
generating, by the LLM and based on the second processed user query, a second list of domain candidates;
assigning, by the LLM, a second confidence score to each domain candidate in the second list of domain candidates;
identifying a second domain candidate from the second list of domain candidates using the second confidence scores;
making a fourth determination that there is a previous domain associated with the first processed user query;
making a fifth determination, based on the fourth determination, that the second domain candidate is different than the previous domain associated with the first processed user query;
making a sixth determination, based on the fifth determination, that the second domain candidate corresponds to a follow-up domain;
in response to the sixth determination:
converting the second processed user query to a follow-up question;
providing the follow-up question and any previous conversation history associated with at least the first processed user query to the RAG application;
obtaining, from the RAG application and based on the providing, relevant information and providing the relevant information, any previous conversation history associated with at least the first processed user query, and the follow-up question to the LLM; and
generating, by the LLM and in response to the obtaining, output and providing the output to the user via the user interface.

13. The non-transitory CRM of claim 8, the method further comprising:

after generating, by the LLM, output and providing the output to the user via the user interface:
asking the user via the user interface whether the output was accurate;
making a fourth determination that the output was accurate; and
classifying, based on the fourth determination, the output as accurate and using the output to refine the LLM.

14. The non-transitory CRM of claim 8, the method further comprising:
after generating, by the LLM, output and providing the output to the user via the user interface:
asking the user via the user interface whether the output was accurate;
making a fourth determination that the output is not accurate; and
in response to the fourth determination, the output is not used to refine the LLM.

15. An intelligent history management system, comprising:
a processor;
a large language model (LLM);
memory comprising instructions, which when executed by the processor, performs a method for switching domains using history management, the method comprising:
obtaining a user query from a user via a user interface;
cleaning the user query to obtain a pre-processed user query;
extracting key features from the pre-processed user query to obtain a first processed user query;
providing the first processed user query to the LLM, wherein the first processed user query is associated with a user;
generating, by the LLM and based on the first processed user query, a first list of domain candidates;
assigning, by the LLM, a first confidence score to each domain candidate in the first list of domain candidates;
identifying a first domain candidate from the first list of domain candidates using the first confidence scores;
making a first determination that there is a previous domain, wherein the previous domain is associated with another user query previously provided by the user;
making a second determination, based on the first determination, that the first domain candidate is different than the previous domain;
making a third determination, based on the second determination, that the first domain candidate does not correspond to a follow-up domain;
switching, based on the third determination, the previous domain to the first domain candidate;
in response to the switching:
erasing any previous conversation history associated with the another user query previously provided by the user and providing only the first processed user query to a Retrieval Augmented Generation (RAG) application;
obtaining, from the RAG application and based on the first processed user query, relevant information and providing the relevant information and the first processed user query to the LLM; and
generating, by the LLM and in response to the obtaining, output and providing the output to the user via the user interface.

16. The intelligent history management system of claim 15, the method further comprising:
providing a second processed user query to the LLM, wherein the second processed user query is associated with a second user;
generating, by the LLM and based on the second processed user query, a second list of domain candidates;
assigning, by the LLM, a second confidence score to each domain candidate in the second list of domain candidates;
identifying a second domain candidate from the second list of domain candidates using the second confidence scores;
making a fourth determination that there is not a previous domain associated with the second user;
in response to the fourth determination:
providing the second processed user query to the RAG application;
obtaining, from the RAG application and based on the second processed user query, relevant information and providing the relevant information and the second processed user query to the LLM; and
generating, by the LLM and in response to the obtaining, output and providing the output to the second user via the user interface.

17. The intelligent history management system of claim 15, the method further comprising:
providing a second processed user query to the LLM associated with the user;
generating, by the LLM and based on the second processed user query, a second list of domain candidates;
assigning, by the LLM, a second confidence score to each domain candidate in the second list of domain candidates;
identifying a second domain candidate from the second list of domain candidates using the second confidence scores;
making a fourth determination that there is a previous domain associated with the first processed user query;
making a fifth determination, based on the fourth determination, that the second domain candidate is not different than the previous domain;
in response to the fifth determination:
providing the second processed user query and any previous conversation history associated with at least the first processed user query to the RAG application;
obtaining, from the RAG application and in response to the providing, relevant information and providing the relevant information, any previous conversation history associated with at least the first processed user query, and the second processed user query to the LLM; and
generating, by the LLM and in response to the obtaining, output and providing the output to the user via the user interface.

18. The intelligent history management system of claim 15, the method further comprising:
providing a second processed user query to the LLM associated with the user;
generating, by the LLM and based on the second processed user query, a second list of domain candidates;
assigning, by the LLM, a second confidence score to each domain candidate in the second list of domain candidates;

identifying a second domain candidate from the second list of domain candidates using the second confidence scores;

making a fourth determination that there is a previous domain associated with the first processed user query;

making a fifth determination, based on the fourth determination, that the second domain candidate is different than the previous domain associated with the first processed user query;

making a sixth determination, based on the fifth determination, that the second domain candidate corresponds to a follow-up domain;

in response to the sixth determination:

converting the second processed user query to a follow-up question;

providing the follow-up question and any previous conversation history associated with at least the first processed user query to the RAG application;

obtaining, from the RAG application and based on the providing, relevant information and providing the relevant information, any previous conversation history associated with at least the first processed user query, and the follow-up question to the LLM; and generating, by the LLM and in response to the obtaining, output and providing the output to the user via the user interface.

19. The intelligent history management system of claim 15, the method further comprising:

after generating, by the LLM, output and providing the output to the user via the user interface:

asking the user via the user interface whether the output was accurate;

making a fourth determination that the output was accurate; and classifying, based on the fourth determination, the output as accurate and using the output to refine the LLM.

20. The intelligent history management system of claim 15, the method further comprising:

after generating, by the LLM, output and providing the output to the user via the user interface:

asking the user via the user interface whether the output was accurate;

making a fourth determination that the output is not accurate; and in response to the fourth determination, the output is not used to refine the LLM.

* * * * *